(12) United States Patent
Moriya

(10) Patent No.: US 6,604,181 B1
(45) Date of Patent: Aug. 5, 2003

(54) COMPUTER READABLE MEDIUM, OPTICAL DISK AND INFORMATION PROCESSING APPARATUS

(75) Inventor: Shun Moriya, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 0 days.

(21) Appl. No.: 09/428,465

(22) Filed: Oct. 28, 1999

(30) Foreign Application Priority Data

Oct. 30, 1998 (JP) .......................................... P10-309918

(51) Int. Cl.$^7$ .......................... G06F 12/02; G06F 19/00
(52) U.S. Cl. .......................... 711/170; 711/112; 463/43
(58) Field of Search .................................. 369/272, 273, 369/275.3; 463/1, 43; 711/118, 125, 126, 140, 112, 170

(56) References Cited

U.S. PATENT DOCUMENTS

| | | | | |
|---|---|---|---|---|
| 5,379,389 A | * | 1/1995 | Whisler | 710/5 |
| 5,732,256 A | * | 3/1998 | Smith | 707/1 |
| 5,769,718 A | * | 6/1998 | Rieder | 463/31 |
| 5,808,821 A | * | 9/1998 | Davy | 360/48 |
| 5,828,369 A | * | 10/1998 | Foster | 707/500.1 |
| 5,870,355 A | * | 2/1999 | Fujihara | 369/32 |
| 5,938,730 A | * | 8/1999 | Tobita | 709/224 |
| 6,165,073 A | * | 12/2000 | Miyamoto et al. | 463/32 |
| 6,215,747 B1 | * | 4/2001 | Jobs | 369/53.24 |
| 6,290,602 B1 | * | 9/2001 | Kawano | 463/23 |

FOREIGN PATENT DOCUMENTS

| | | |
|---|---|---|
| JP | 3-34158 | 2/1991 |
| JP | 7220399 | 8/1995 |
| JP | 7235141 | 9/1995 |

OTHER PUBLICATIONS

Bartee, "Digital Computer Fundamentals", Sixth Edition, McGraw–Hill Inc., 1985, pp. 463–465.*
An English Language abstract of JP 3–34158.
An English Language abstract of JP 7–220399.
An English Language abstract of JP 7–235141.

* cited by examiner

Primary Examiner—Gary Portka
(74) Attorney, Agent, or Firm—Greenblum & Bernstein, P.L.C.

(57) ABSTRACT

Disclosed is a recording medium that is capable of functioning a reading device of an information processing apparatus, without making the reading device to operate inefficiently. The recording medium stores a plurality of program codes each of which is used for displaying game characters, and a plurality of graphic codes utilized to display the game characters by the plurality of the program codes, respectively. The program code and the graphic code regarding each of the game characters are recorded in a area composed of contiguous storage locations on the disk plane of the recording medium. Besides, plural pair of program codes and graphic codes regarding the game characters that may be displayed simultaneously are recorded in a area composed of contiguous storage locations.

12 Claims, 20 Drawing Sheets

COMPUTER READABLE MEDIUM, OPTICAL DISK AND INFORMATION PROCESSING APPARATUS

BACKGROUND OF THE INVENTION

1. Field of the Invention

The present invention relates to a computer readable medium and to an optical disk storing program codes and the likes which are to be read by information processing apparatus (that is computer) and to an information processing apparatus which reads the program codes and the likes from a recording medium during an operation thereof.

2. Description of the Related Art

As is well known, a software to operate an information processing apparatus (that is, a computer, a game machine, etc.) is composed of programs and several pieces of data utilized by the programs, and is distributed through a recording medium in a disk shape (for example,a flexible disk, CD-ROM, etc.). At a time of an execution of the software, a part of the software (that is, program or data) in the recording medium is read out and written over useless information on a RAM of the information processing apparatus.

More concretely, a game software for use in an information processing apparatus (a personal computer or a game machine) is distributed through a CD-ROM 100 having a configuration as shown in FIG. 1, for example. That is, the CD-ROM 100 is generally pressed such that a game program including a main program and a plurality of program codes is recorded in a recording area 100c at an inner radius side of the disk plane thereof, a group of animation data is recorded in a recording area 100a at its outer radius side, and a group of graphic data is recorded in a recording area 100b therebetween. In other words, a recording area composed of contiguous storage locations (sectors) that exist near the center of the CD-ROM 100 is used for storing the game program, and a recording area composed of contiguous storage locations that exist near the outer edge of the CD-ROM 100 is used for storing the animation data. Furthermore, the program codes, the animation data, the graphic data and the likes are recorded in the CD-ROM 100 in a form where each information can be identified by a file name.

The CPU in the information processing apparatus having a CD-ROM drive that is set with the CD-ROM 100 will operate as follows. At first, the CPU read out the main program within the recording area 100c onto the RAM by controlling the CD-ROM drive.

Thereafter, the CPU, in accordance with the main program in the RAM, reads out several units of information (usually, several program codes and several graphic data) from the CD-ROM 100 to the RAM.

Then, the CPU begins a control using the information prepared on the RAM, and if a predetermined condition (for example, a condition for proceeding to a new stage) is fulfilled, it reads several information corresponding to the fulfilled condition, from the CD-ROM 100, and stores them on the RAM to overwrite useless information. Then, it begins a control that utilizes this newly prepared information.

As described above, in the information processing apparatus that is set with the CD-ROM 100, processing to read out several pieces of information necessary for continuing the execution of program from the CD-ROM 100 and stored in the RAM is executed. The configuration of the CD-ROM 100 described above causes the CD-ROM drive to operate inefficiently at a time of this processing (hereinafter, it refers to as an update processing).

That is, at a time of the update processing, usually, several graphic data and several program codes are read out from the CD-ROM 100. But, in the CD-ROM 100, these information are recorded in the recording areas that are separated each other. As a result, there are many occasions that the head of the CD-ROM drive is not located in a neighborhood of the recording area of the information in the CD-ROM 100 at the time when a read instruction for a certain information is issued to the CD-ROM drive during the update processing, which causes that a relatively long latency time is included in a response time (an access time) for each of the read instructions.

Further, the access time for the data recorded in the recording area at the outer radius side, and the access time for the data recorded in the storage area at the inner radius side are different according to a type of the CR-ROM drive used for reading the CD-ROM 100, so that there exist a CD-ROM drive in which the former access time is shorter, and the CD-ROM drive in which the latter access time is shorter. The configuration of the CD-ROM 100 has been designed without this point taken into consideration.

Further, in the CD-ROM 100, each information is recorded as a file, in accordance with the ISO9660 file system in which a file name of 32 (or 12) letters (each of which has size of 1 byte) and a directory name of 8 letters are used. Accordingly, managing information which is used for managing the files is also recorded in the CD-ROM 100. Therefore, a storage capacity of the CD-ROM 100 that can be used for storage of a program is limited because of the managing information.

Also, as to a software other than a game software supplied through the CD-ROM or other types of recording medium (a flexible disk and the likes), a group of data utilized by a program are collected and recorded in a storage area different from the one for the program. Thus, the configuration of conventional recording medium causes a reading device to operate inefficiently, although there is a variation of degrees according to the types thereof and to the contents of programs recorded therein.

SUMMARY OF THE INVENTION

It is an object of the present invention to provide a computer readable medium or an optical disk, capable of operating an information processing apparatus without making a reading device of the information processing apparatus to perform an inefficient operation.

It is another object of the present invention to provide an information processing apparatus of which reading device does not operate inefficiently.

It is yet another object of the present invention to provide a computer readable medium or an optical disk, whose storage capacity is used efficiently.

In order to achieve the above mentioned objects, a computer readable medium which is readable by a computer according to one aspect of the present invention comprises a plurality of program codes each of which is executed by the computer to perform specific processing and a plural pieces of data utilized by the computer executing related one of the plurality of program codes, wherein each of the plurality of program codes and its related data among the plural pieces of data are recorded at contiguous storage locations on the medium.

In this aspect of the present invention, a computer readable medium is configured in such a manner that the information (that is, the program code and the data) required for performing a certain processing can be read out continuously. By setting this recording medium to a reading device of an information processing apparatus such as a computer and a game machine, a reading of the necessary information will be completed without causing the head of the reading device to perform a useless operation. Accordingly, if the recording medium of the present invention is used, the information processing apparatus can be functioned in a state that a latency time is less, in other words, the information processing apparatus can be functioned much faster than the conventional ones.

An optical disk in another aspect of the present invention is a disk which is to be set to an optical disk reading device connected to a computer and be able to read information recorded in a storage location at an outer radius side on a disk plane thereof faster than information recorded in a storage location at an inner radius side on the disk plane. The optical disk comprises a plurality of program codes each of which is executed by the computer to perform specific processing and a plural pieces of data each of which is utilized by the computer executing related one of the plurality of program codes, wherein each of the plurality of program codes and its related data among the plural pieces of data are recorded at contiguous storage locations on the disk plane.

With this optical disk, a reading of the required information will be completed without making the head of the optical disk reading device operate uselessly, which enables the information processing apparatus to function much faster than the conventional ones.

If the optical disk of the present invention is manufactured, it is preferable that the plurality of program codes and the plural pieces of data are recorded in a recording area at outer radius side of the disk platter. Moreover, in a recording area at the inner radius side of the disk plane, it is preferable to record data not to be used frequently, for example, animation data.

Further, if the optical disk of the present invention is manufactured, it is preferable to arrange so that all information recorded therein will form one file. More specifically, it is preferable to arrange the program codes, the utilized data and the likes such that they are not recorded as the respective files but as one file. In this optical disk, since information for managing the file name is not recorded, the storage capacity thereof is effectively utilized.

In actualizing the optical disk of the invention, graphic codes that are required for displaying game characters may be used as the plurality of utilized data.

An optical disk which is readable by a computer in another aspect of the invention comprises a movie data, a game program which is executed by the computer to perform controlling movie reproduction and a game operation based on the movie data and a plurality of data utilized by the computer executing game program, wherein the movie data and the game program are recorded in a recording area at an inner radius side on a disk plane thereof, and the plural pieces of data are recorded in a recording area at an outer radius side on the disk plane.

With this optical disk, it is possible to function the information processing apparatus with the optical disk drive which reads an information recorded in a storage location at the outer radius side faster than an information recorded in a storage location at the inner radius side of disk plane, at fast speed.

Moreover, an information processing apparatus in one aspect of the present invention comprises a reading device to which the recording medium as described above is set and which reads out the information from the recording medium. An information processing apparatus in another aspect of the present invention comprises an optical reading device to which the optical disk as described above is set and which reads out the information from the recording medium. Accordingly, these information processing apparatuses of the invention operate at faster speed than the information processing apparatuses set with general recording media.

BRIEF DESCRIPTION OF THE DRAWINGS

Further objects and advantages of the invention can be more fully understood from the following detailed description taken in conjunction with the accompanying drawings in which.

DESCRIPTION OF THE PREFERRED EMBODIMENTS

The embodiments of the present invention will be described more concretely with reference to the accompanying drawings.

Figure 2:
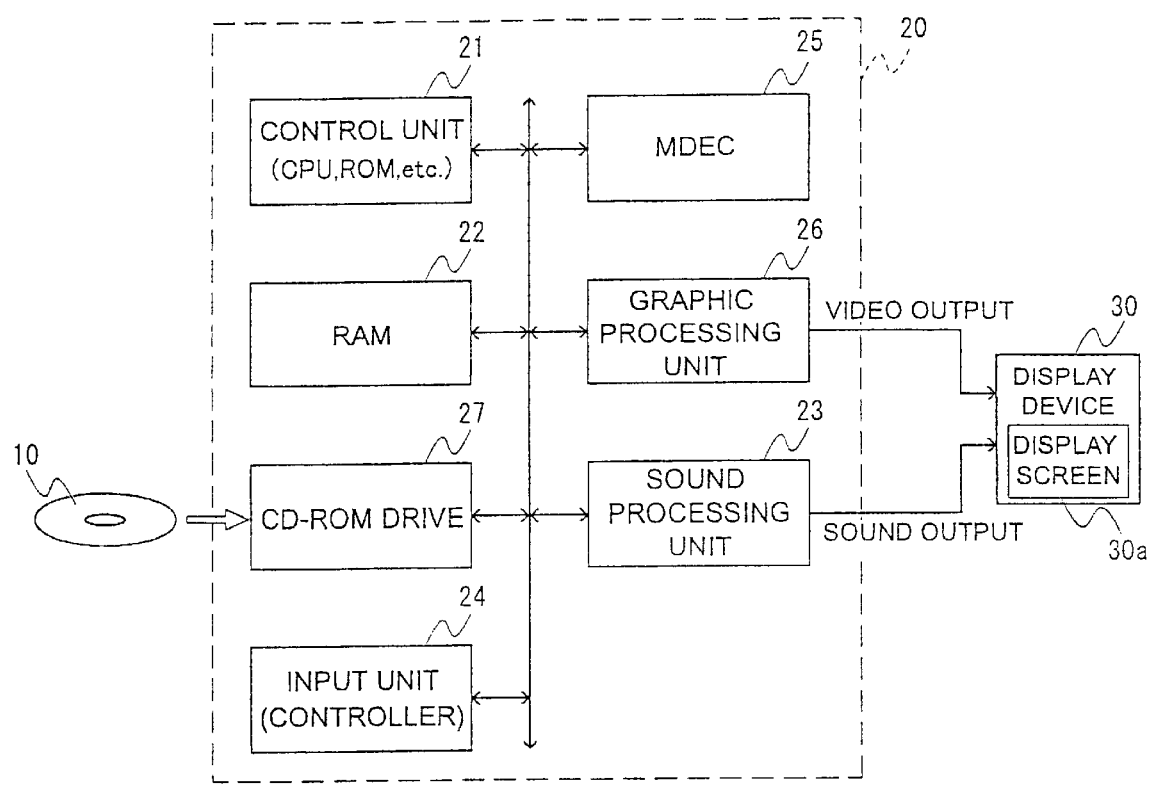
FIG. 2 is a block diagram showing a schematic configuration of an information processing apparatus according to one embodiment of the present invention.

At first, with reference to FIG. 2, a hardware configuration of an information processing apparatus according to one embodiment of the present invention will be described.

As shown in the figure, the information processing apparatus 20 according to the present embodiment includes, for example, a control unit 21, a RAM 22, a sound processing unit 23, an input unit 24, an MDEC 25, a graphic processing unit 26 and a CD-ROM drive 27, as the main components thereof. This information processing apparatus 20 is used in a state where it is connected to a display device 30 (so-called home television set) that includes a display screen 30a and a speaker, through the graphic processing unit 26 and the sound processing unit 23.

The control unit 21 is composed of a CPU, a ROM and the likes. The control unit 21 (CPU) integratedly controls the respective units within the information processing apparatus 20 according to the program stored in the RAM 22 (or ROM as the case may be). The CD-ROM drive 27 is a reading device for a CD-ROM 10 which stores a software (that is, game program) that defines the operation procedures of the control unit 21. The CD-ROM drive 27 reads out data recorded in the outer radius side of the CD-ROM 10 at faster speed rather than the inner radius side.

The sound processing unit 23 creates and outputs a sound signal to generate a voice, a music, a sound effect and the likes from the speaker built in the display device 30.

The sound processing unit 23 creates and outputs a sound signal, based on the data that is read out from the CD-ROM 10 by the CD-ROM drive 27 and stored in the RAM 22, under the control of the control unit 21. The input unit 24 is an interface through which a user inputs information to the information processing apparatus 20. The respective units other than the input unit 24 in the information processing apparatus 20 are accommodated in a body, and the input unit 24 is accommodated another device which is called a controller and which is to be connected to the body through a cable. The information processing apparatus 20 may be the one of which input unit 24 and other units are accommodated in one body.

The MDEC 25 is a circuit that is capable of executing an inverse DCT (discrete cosine transformation) operation at fast speed. The MDEC 25 is used for expanding data that is compressed in the JPEG (Joint Photographic Experts Group) or the MPEG (Moving Picture Expert Group) systems and the likes. More specifically, the MDEC 25 is used for expanding the image data, the animation data and the likes that are compressed and recorded in the CD-ROM 10.

The graphic processing unit 26 contains a frame buffer, which draws an image (a polygon) corresponding to an instruction supplied from the control unit 21 on the frame buffer, as well as creates and outputs a video signal corresponding to the image drawn on the frame buffer. The graphic processing unit 26 also performs a processing to output a video signal based on the expansion result by the MDEC 25.

In the following, an operation of the information processing apparatus 20, and a configuration of the CD-ROM 10 will be described in detail.

Figure 3:
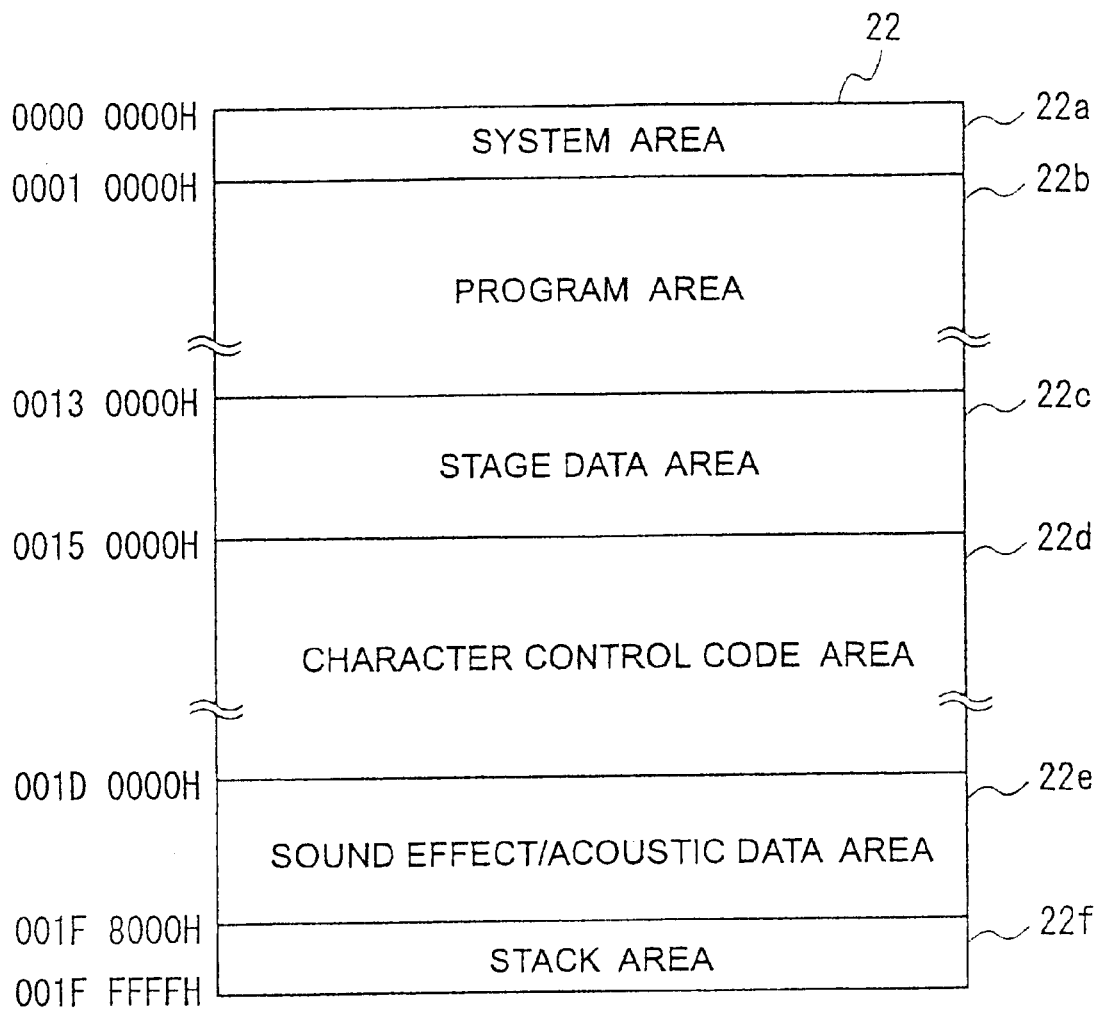
FIG. 3 is an illustrative diagram showing a usage configuration of a RAM in the information processing apparatus.

At first, with reference to FIG. 3, a usage configuration of the RAM 22 in the information processing apparatus 20 will be explained. As shown in the figure, the storage area of the RAM 22 is separated into a system area 22a, a program area 22b, a stage data area 22c, a character control code area, a sound effect/audio data area 22e, and a stack area 22f.

The system area 22a is an area in which an OS (operating system) of the information processing apparatus 20 is allocated. The system stack area 22f is a working area of the OS.

The program area 22b is an area to which a main part of a program (hereinafter, it is referred to as a main program) stored in the CD-ROM 10 is read in. Further, in this area, a code table (described in detail below) that is referred to at a time when the various types of codes contained in the CD-ROM 10 is read is also stored.

The stage data area 22c is an area into which a graphic data of a background image that is used for displaying of a stage in the video game is stored.

The character control code area 22d is an area into which information required for displaying game characters is stored. In this area, for every character that will appear on a stage in the video game, a graphic code defining a basic shape thereof, and a program code for displaying the character in the various attitudes based on the graphic code thereof are stored. More specifically, in the character control code area 22d, several pairs of the graphic codes and the program codes required for displaying the game characters are stored.

The sound effect/audio data area 22e is an area into which data to be reproduced as a voice, a music, a sound effect and the like by processing of the sound processing unit 23 are stored.

Reading out the graphic data, the program codes and the likes from CD-ROM 10 to the RAM 22 is performed at each time when the video game on a new stage is started.

Figure 4:
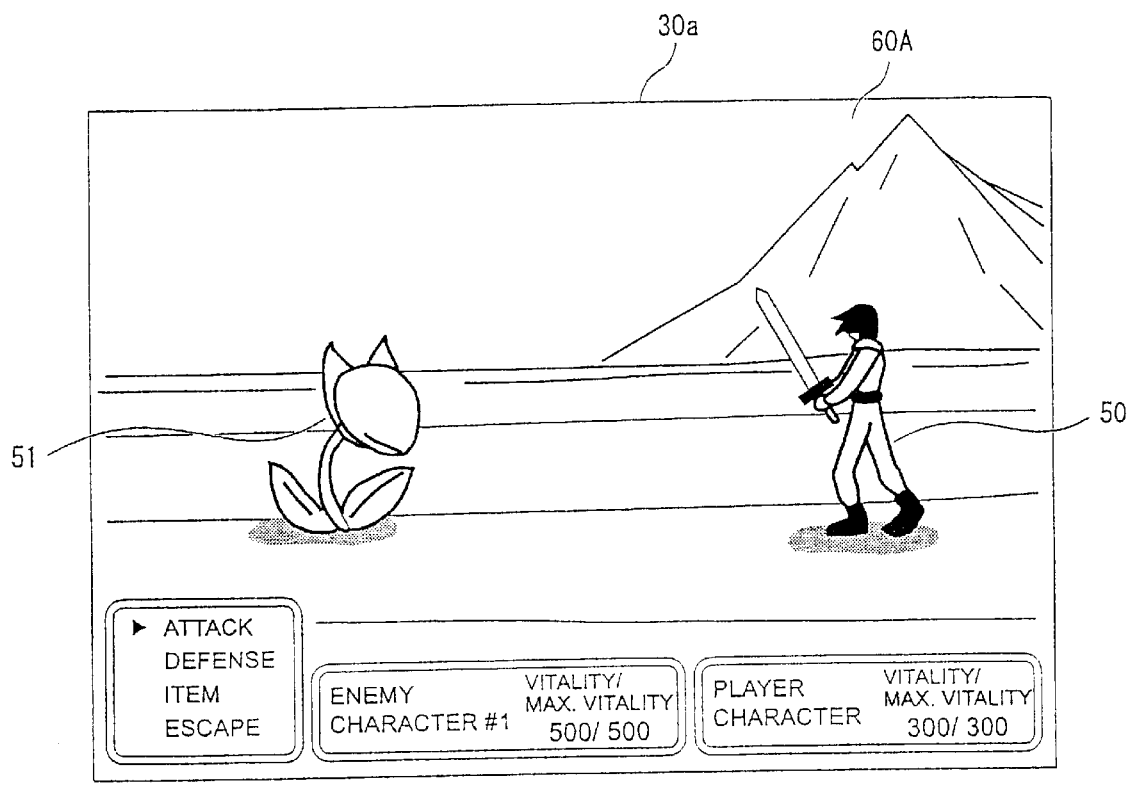
FIG. 4 is a diagram showing one example of image displayed on a display screen by the information processing apparatus.
Figure 5:
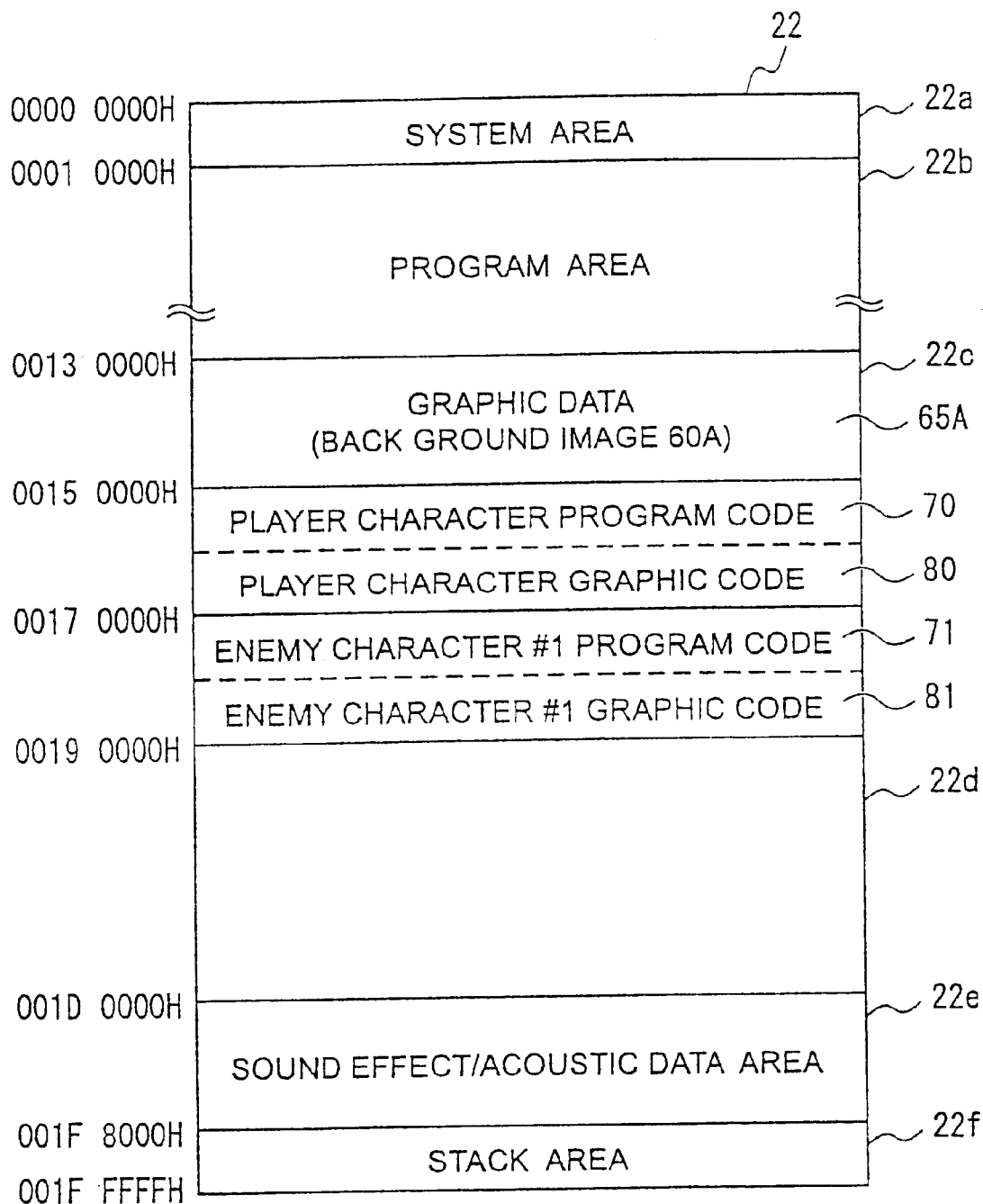
FIG. 5 is an illustrative diagram showing a usage status of the RAM at a time of displaying the image shown in FIG. 3.
Figure 6A:
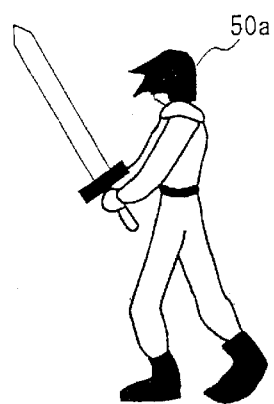
FIGS. 6A, 6B and 6C are diagrams for illustrating a program code and a graphic code used for displaying a player characters.
Figure 6B:
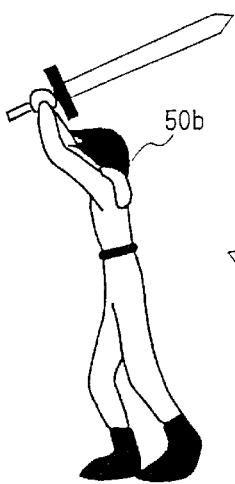
Figure 6C:
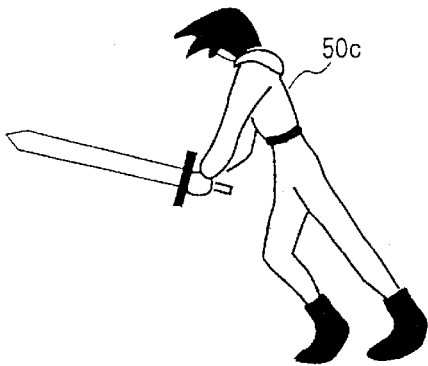
Figure 7A:
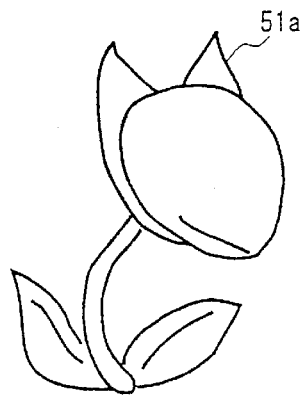
FIGS. 7A, 7B and 7C are diagrams used for explanation of a program code and a graphic code displaying an enemy characters #1.
Figure 7B:
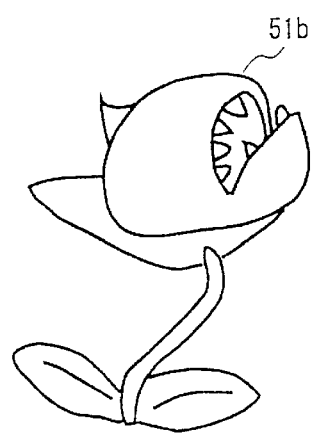
Figure 7C:
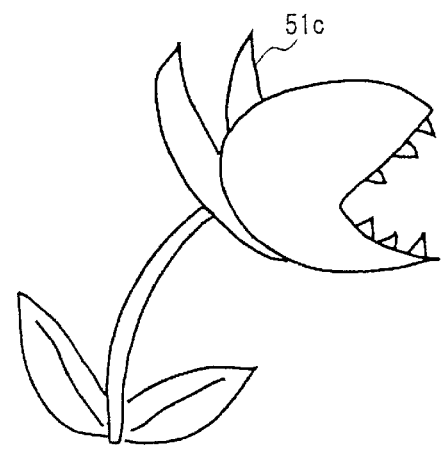

As shown in FIG. 4, in a stage, a player character 50, an enemy character 51 (the enemy character #1) and a background image 60A are displayed on the display screen 30a. At a time the video game on this stage is started, the content of the RAM 22 is updated to the one shown in FIG. 5. More specifically, a graphic data 65A for the background image 60A recorded in the CD-ROM 10 is read out and then stored into the stage data area 22c in the RAM 22. Further, a program code 70 and a graphic code 80 for displaying the player character in various attitudes, for example, as the ones 50a, 50b and 50c shown in FIGS. 6A, 6B and 6C are read out from the CD-ROM 10 and then stored into the character control code area 22d. Moreover, a program code 71 and a graphic code 81 for displaying the enemy character #1 in various attitudes, for example as the ones 51a, 51b and 51c shown in FIGS. 7A, 7B and 7C, are read out from the CD-ROM 10 and then stored into the character control code area 22d. Note that, at a time when the graphic data 65A for the background image 60A, the program code 70, the graphic code 80 and the likes are read out, the code table stored in the program area 22b is referred. The detail of the code table will be described later, together with the configuration of the CD-ROM 10 which is the recording configurations of the program code 70, the graphic code 80 and the likes.

Figure 8:
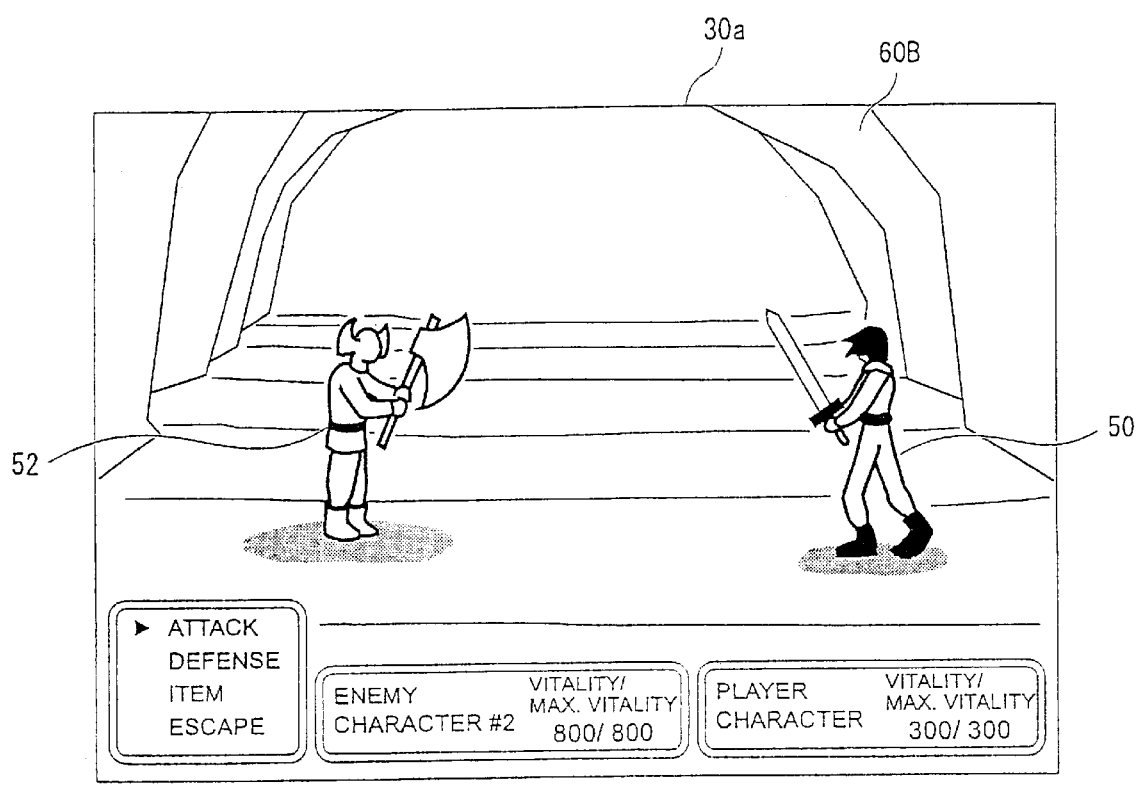
FIG. 8 is a diagram showing one example of image displayed on the display screen by the information processing apparatus.
Figure 9:
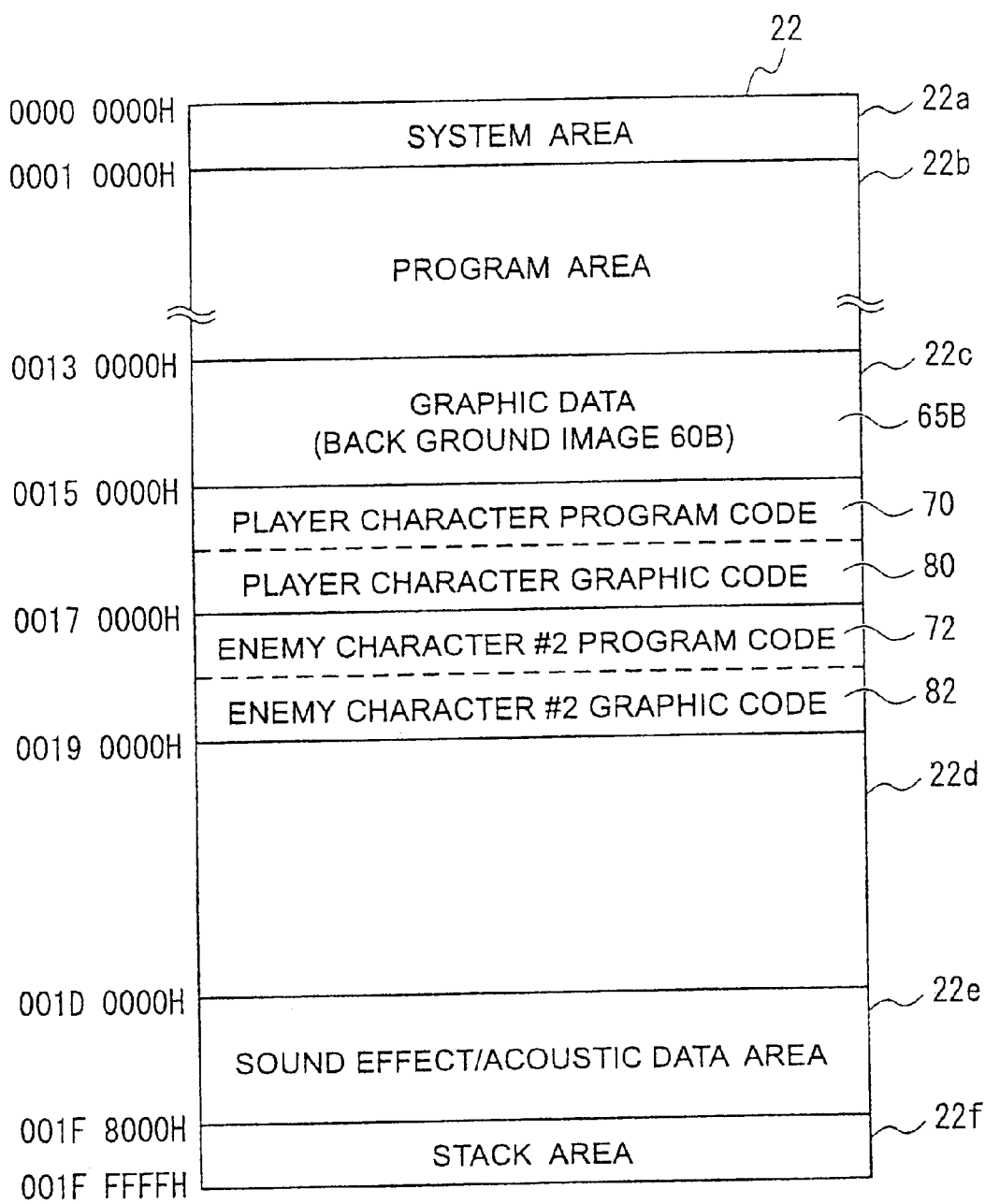
FIG. 9 is an illustrative diagram showing a usage status of the RAM at a time of displaying the image shown in FIG. 8.
Figure 10A:
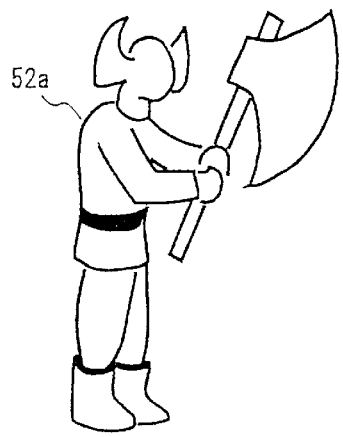
FIGS. 10A, 10B and 10C are diagrams used for explanation of a program code and a graphic code displaying an enemy characters #2.
Figure 10B:
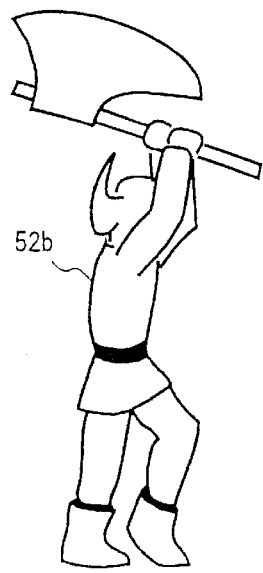
Figure 10C:
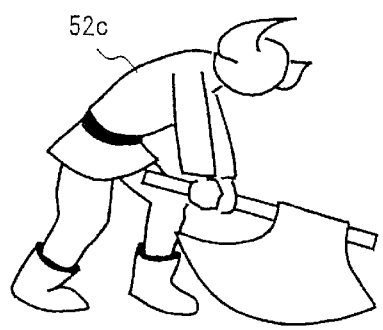

In another stage, as shown in FIG. 8, the player character 50, an enemy character 52 (an enemy character #2) and a background image 60B are displayed on the display screen 30a. At a time when the video game on this stage is stated, the content of the RAM 22 is updated to the one as shown in FIG. 9. More specifically, a graphic data 65B for the background image 60B is read in to the stage data area 22c. Further, the program code 70 and the graphic code 80 for the player character 50, and a program code 72 and a graphic code 82 for displaying the enemy character #2 in various attitudes, for example as the ones 52a, 52b and 52c shown in FIGS. 10A, 10B and 10C are read in to the character control code area 22d.

Figure 11:
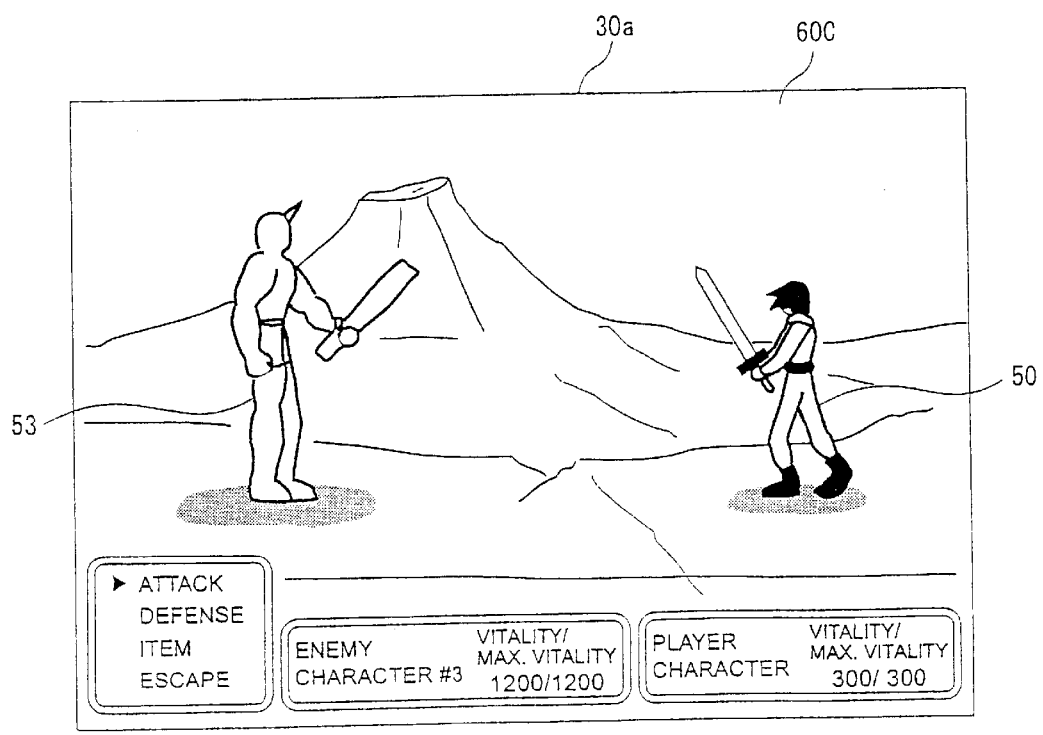
FIG. 11 is a diagram showing one example of image displayed on the display screen by the information processing apparatus.
Figure 12:
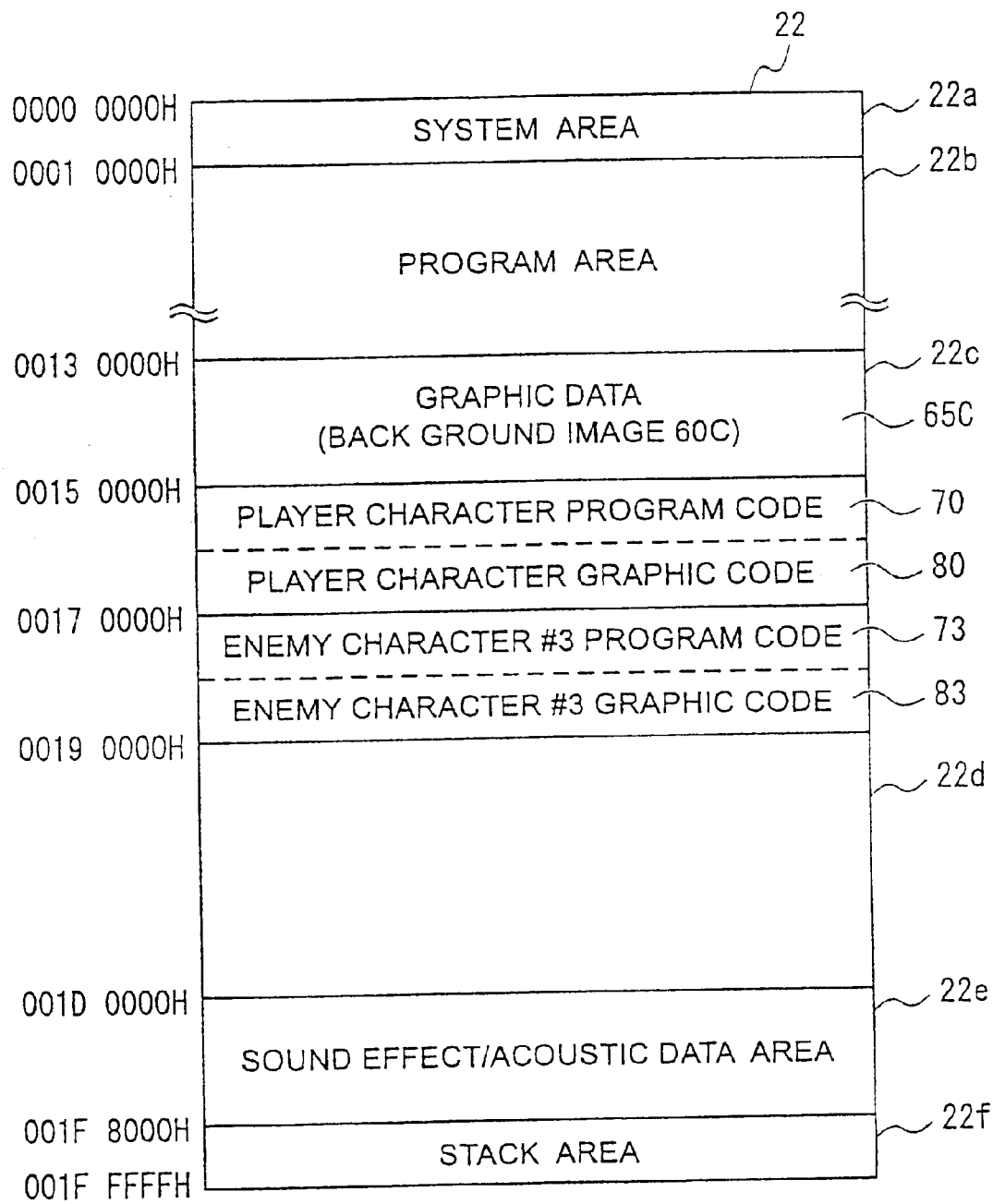
FIG. 12 is an illustrative diagram showing a usage configuration of the RAM at a time of displaying the image shown in FIG. 11.
Figure 13A:
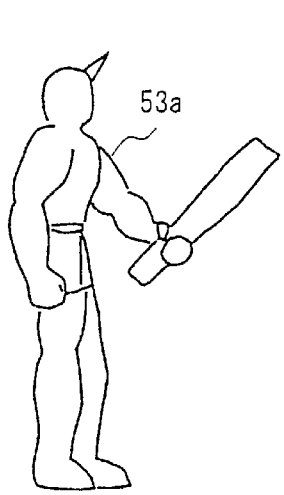
FIGS. 13A, 13B and 13C are diagrams used for explanation of a program code and a graphic code used for displaying enemy character #3.
Figure 13B:
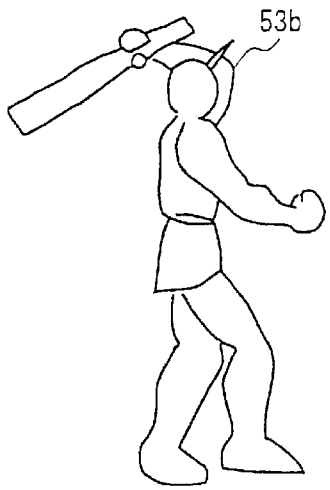
Figure 13C:
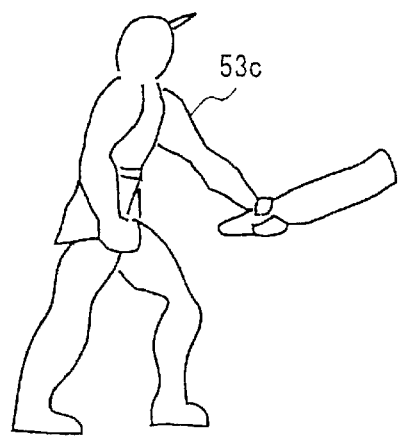

In another stage, as shown in FIG. 11, the player character 50, an enemy character 53 (an enemy character #3) and a background image 60C are displayed on the display screen 30a. At a time when the video game on this stage is started, the content of the RAM 22 is updated to the one shown in FIG. 12. More specifically, a graphic data 65C for the background image 60C is read in to the stage data area 22c. Further, the program code 70 and the graphic code 80 for the player character 50, and a program code 73 and a graphic code 83 for displaying the enemy character #3 in various attitudes, for example as the ones 53a, 53b and 53c shown in FIGS. 13A, 13B and 13C are read in to the character control code area 22d.

Figure 14:
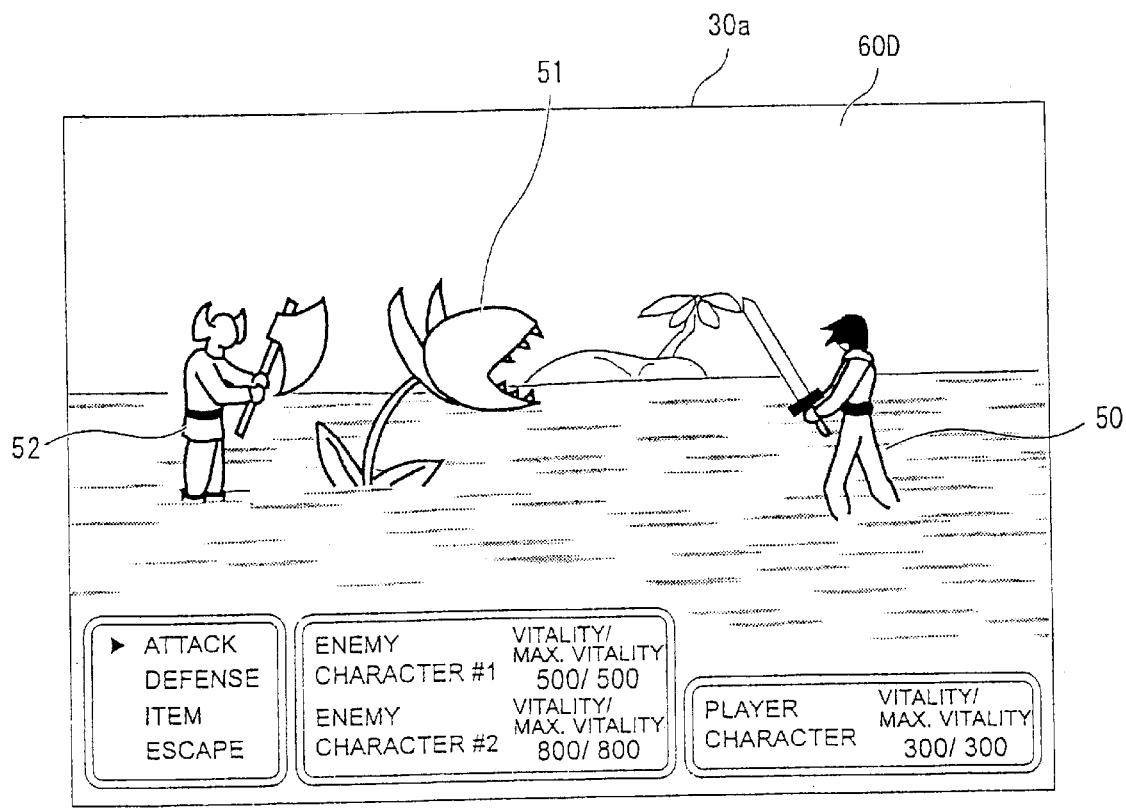
FIG. 14 is a diagram showing one example of image displayed on a display screen by the information processing apparatus.
Figure 15:
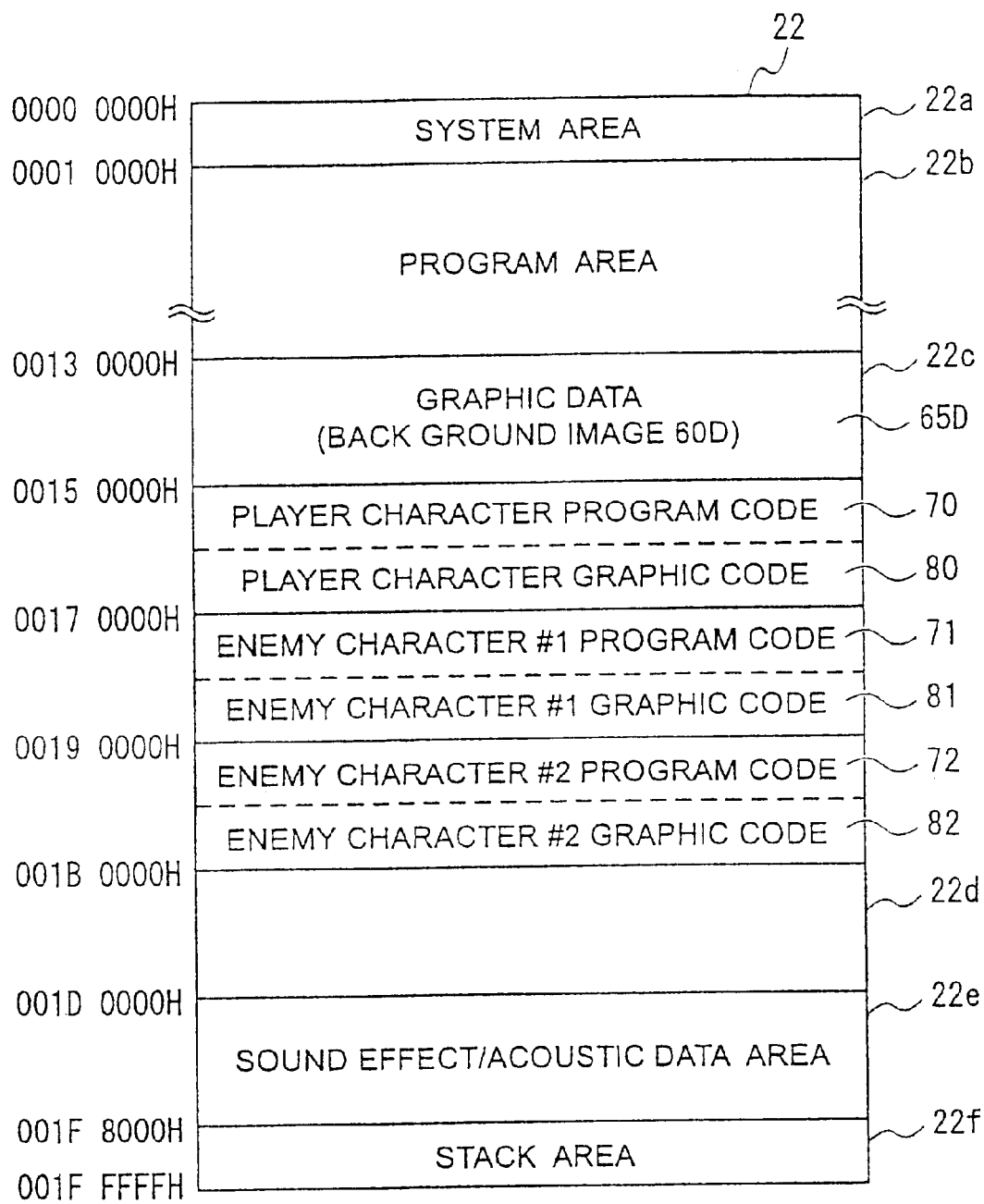
FIG. 15 is an illustrative diagram showing a usage status of the RAM at a time of displaying the image shown in FIG. 14.

In another stage, the player character 50, the enemy characters 51, 52 (the enemy characters #1, #2) and a background image 60D are displayed on the display screen 30a as shown in FIG. 14. At a time when the video game on this stage is stated, the content of the RAM 22 is updated to the one shown in FIG. 15. More specifically, a graphic data 65D for the background image 60D is read in to the stage data area 22c. Further, a pair of the program code 70 and the graphic code 80 for the player character 50, a pair of the program code 71 and the graphic code 81 for the enemy character 51, and a pair of the program code 72 and the graphic code 82 for the enemy character 52 are read in to the character control code area 22d.

Figure 16:
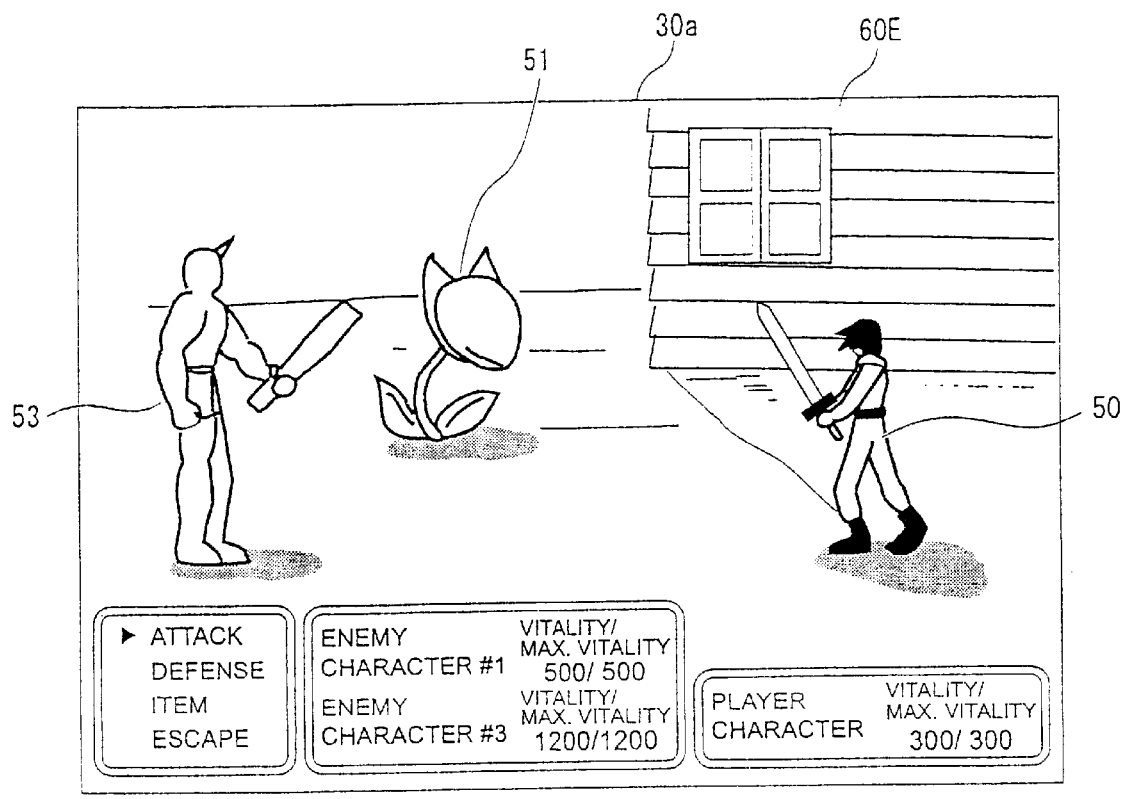
FIG. 16 is a diagram showing one example of image displayed on a display screen by the information processing apparatus.
Figure 17:
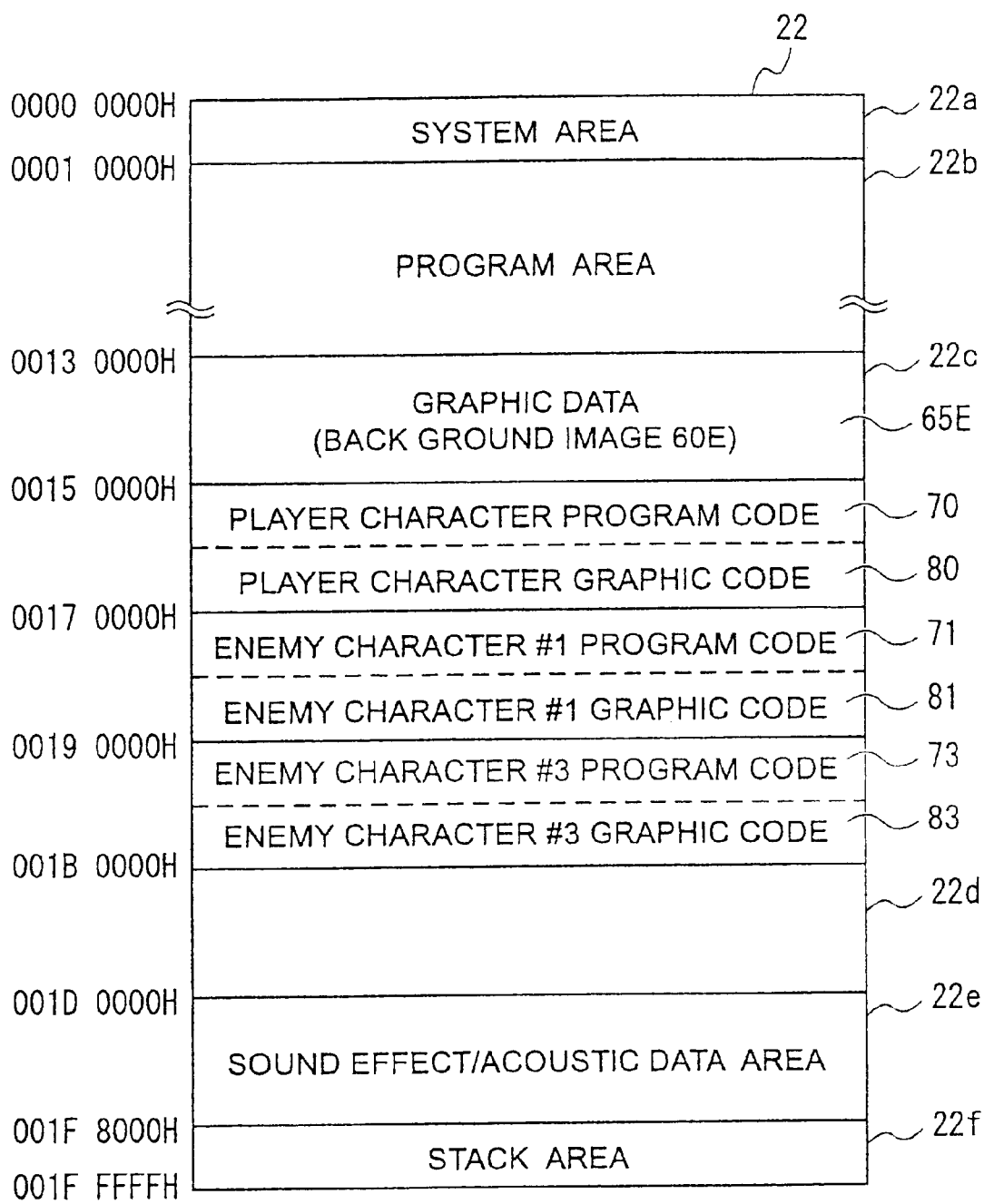
FIG. 17 is an illustrative diagram showing a usage status of the RAM at a time of displaying the image shown in FIG. 16.

In another stage, the player character 50, the enemy characters 51, 53 (the enemy characters #1, #3) and a background image 60E are displayed on the display screen 30a as shown in FIG. 16. At a time when the video game on this stage is started, the content of the RAM 22 is updated to the one shown in FIG. 17. More specifically, a graphic data 65E for the background image 60E is read in to the stage data area 22c. Further, a pair of the program code 70 and the graphic code 80 for the player character 50, a pair of the program code 71 and the graphic code 81 for the enemy character 51, and a pair of the program code 73 and the graphic code 83 for the enemy character 53 are read in to the character control code area 22d.

Figure 18:
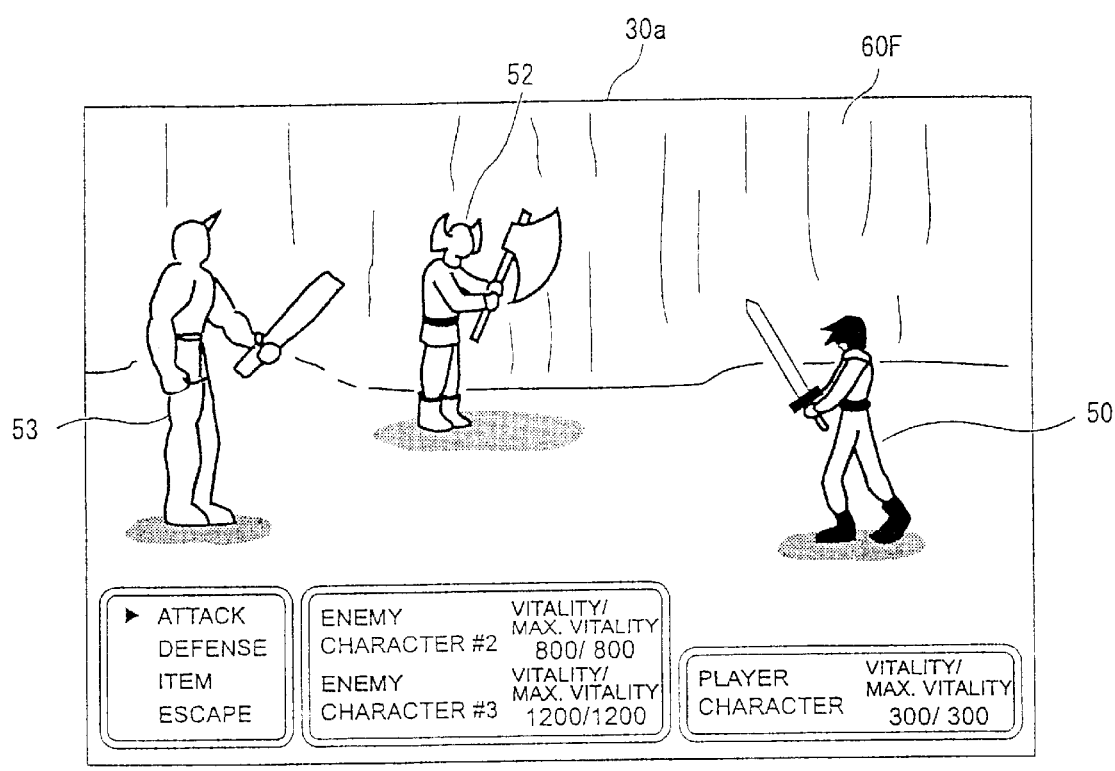
FIG. 18 is a diagram showing one example of image displayed on a display screen by the information processing apparatus.
Figure 19:
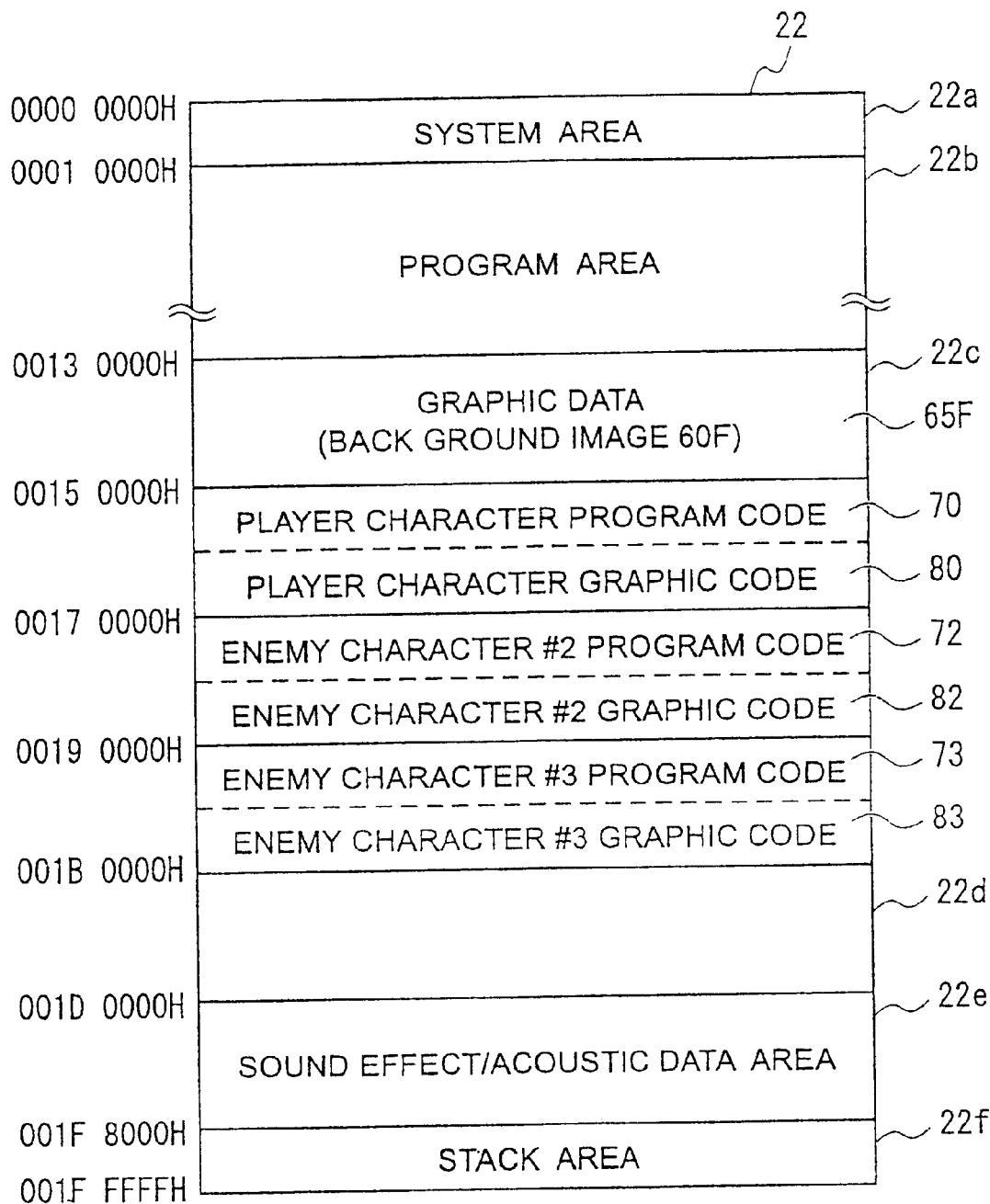
FIG. 19 is an illustrative diagram showing a usage status of the RAM at a time of displaying the image shown in FIG. 18.

In another stage, the player character 50, the enemy characters 52, 53 and a background image 60F are displayed on the display screen 30a as shown in FIG. 18. At a time when the video game of this stage is started, the content of the RAM 22 is updated to the one shown in FIG. 19. More specifically, a graphic data 65F for the background image 60F is read in to the stage data area 22c. Further, a pair of the program code 70 and the graphic code 80 for the player character 50, a pair of the program code 72 and the graphic code 82 for the enemy character 52, and a pair of the program code 73 and the graphic code 83 for the enemy character 53 are read in to the character control code area 22d.

Figure 20:
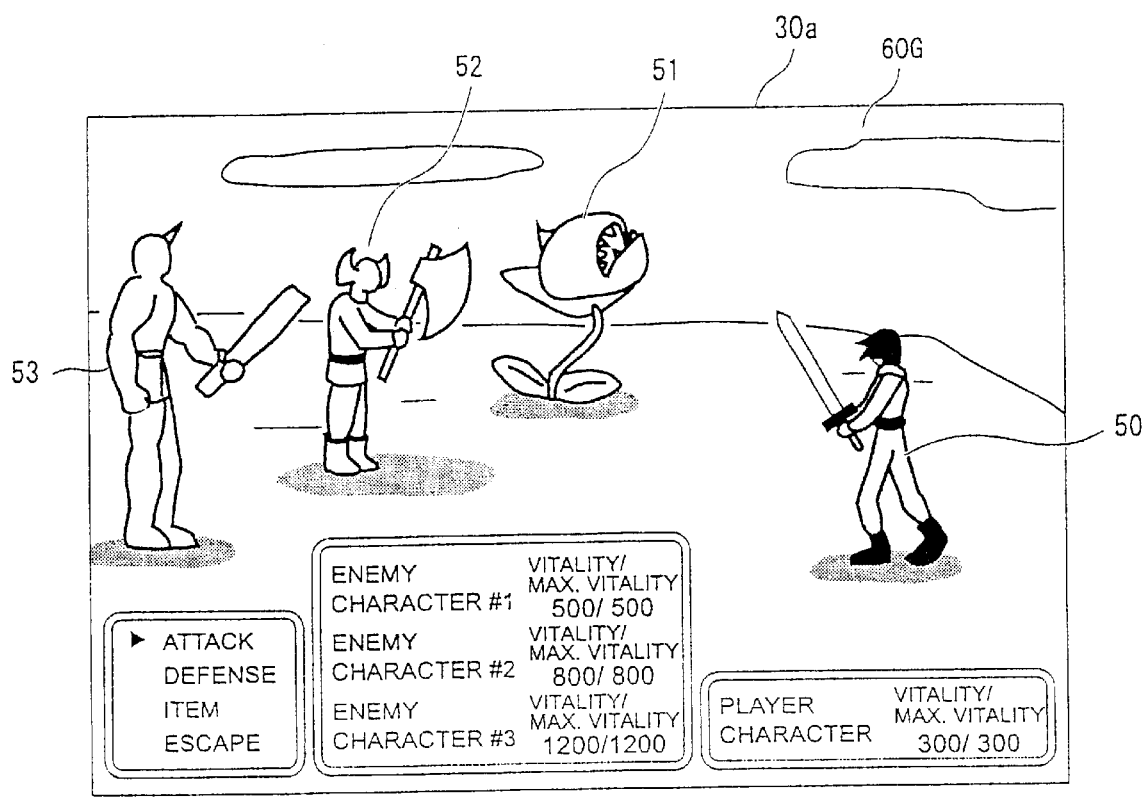
FIG. 20 is a diagram showing one example of image displayed on a display screen by the information processing apparatus.
Figure 21:
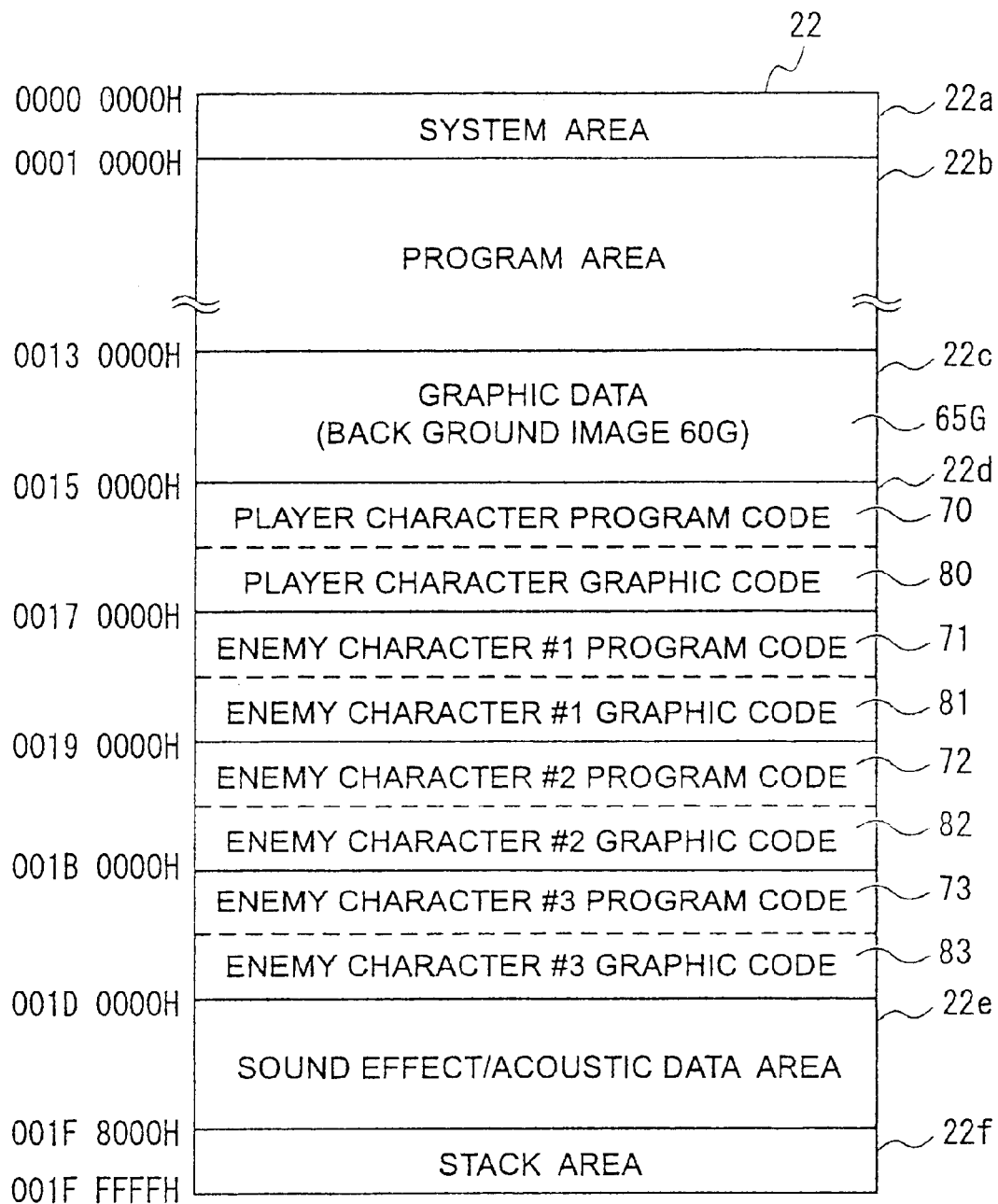
FIG. 21 is an illustrative diagram showing a usage status of the RAM at a time of displaying the image shown in FIG. 20.

In another stage, the player character 50, the enemy characters 51 through 53 and a background image 60G are displayed on the display screen 30a, as shown in FIG. 20. At a time when the video game on this stage is started, the content of the RAM 22 is updated to the one shown in FIG. 21. More specifically, a graphic data 65G for the background image 60G is read in to the stage data area 22c. Further, a pair of the program code 70 and the graphic code 80 for the player character 50, a pair of the program code 71 and the graphic code 81 for the enemy character 51, a pair of the program code 72 and the graphic code 82 for the enemy character 52, and a pair of the program code 73 and the graphic code 83 for the enemy character 53 are read in to the character control code area 22d.

Figure 22:
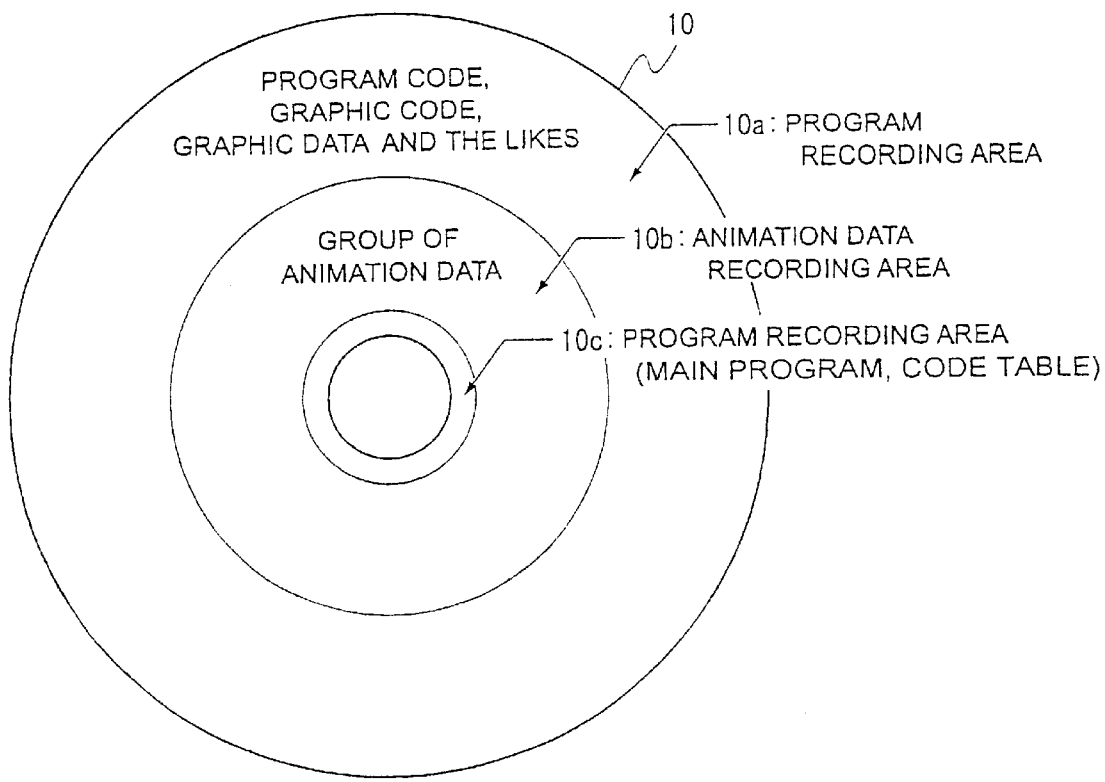
FIG. 22 is an illustrative diagram showing a configuration of a CD-ROM according to the embodiment.
Figure 23:
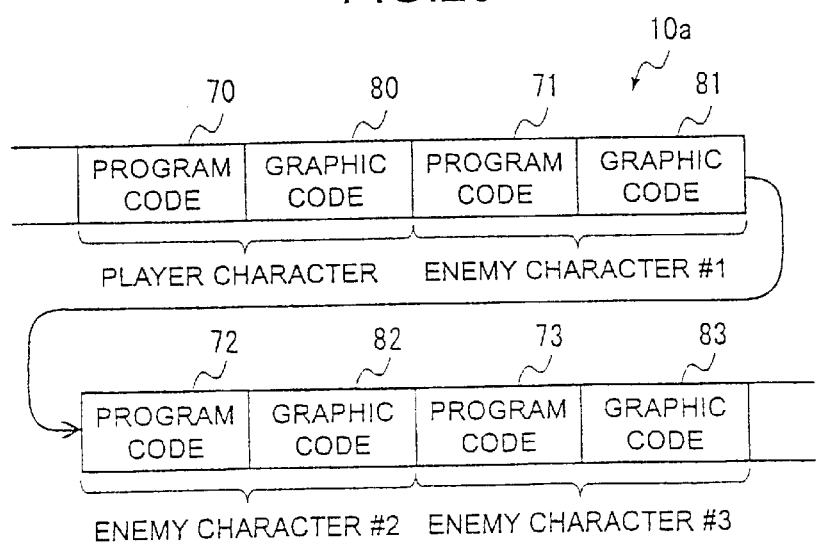
FIG. 23 is an illustrative diagram showing a usage status of the program recording area at the outer radius side in the CD-ROM.

On the CD-ROM 10, these pieces of information (graphic data, program codes, graphic codes, etc.) which are to be read out by the information processing apparatus under the control of the main program are stored in the configurations as shown in FIGS. 22, 23.

Figure 1:
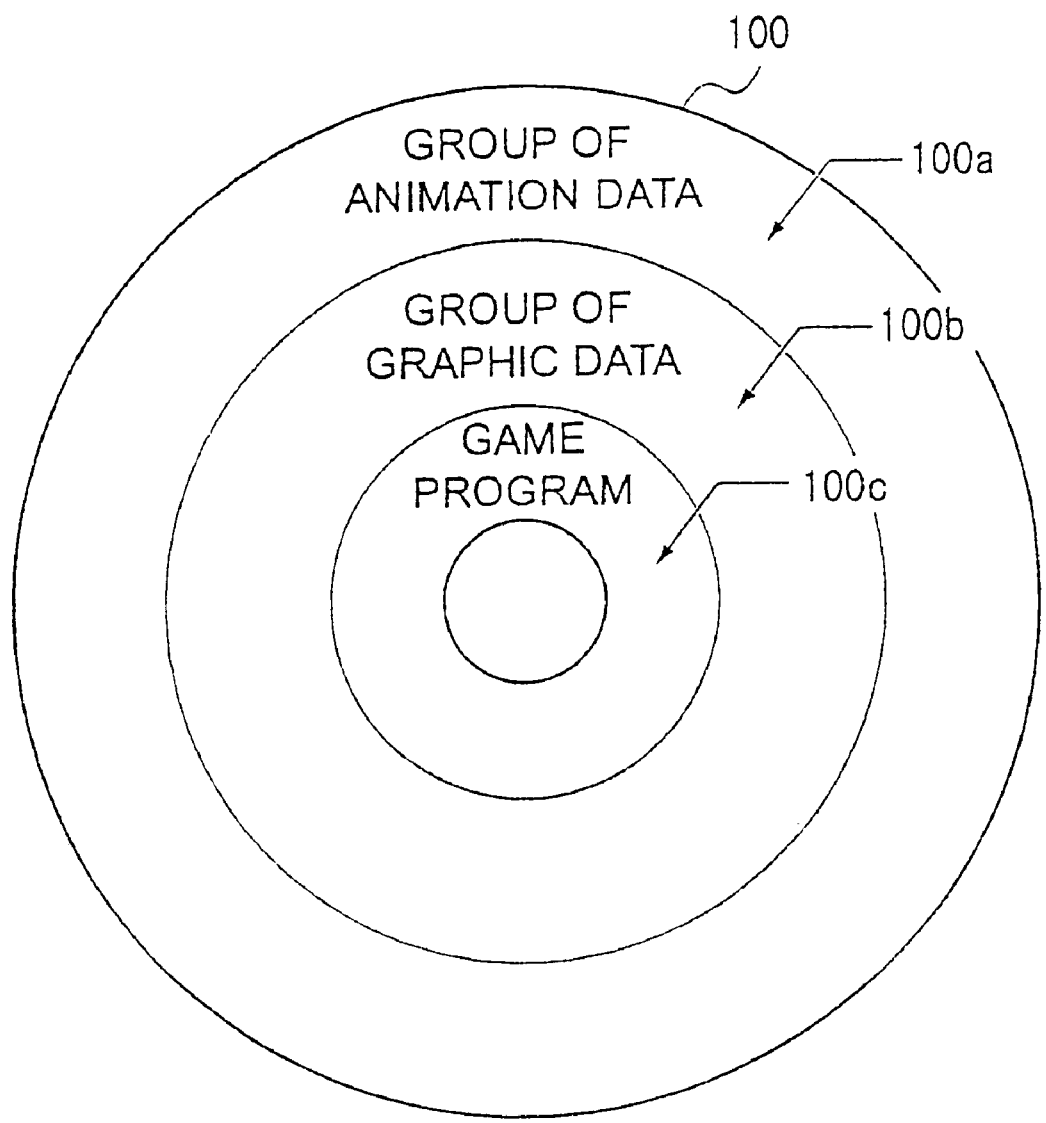
FIG. 1 is an illustrative diagram showing a configuration of a general CD-ROM.

More specifically, the recording area on the CD-ROM 10 is roughly divided into two program recording areas 10a, 10c and one animation data recording area 10b. The animation data recording area 10b is equivalent to the recording area 100a in the CD-ROM 100 shown in FIG. 1. The animation data recording area 10b is stored with movie data used at a time when the video game starts, and/or movie data used at a time when a specific event is occurred during an execution of a game which are compressed in the forms of the JPEG or the MPEG, and the likes.

Whole of the program recording areas 10a, 10c is equivalent to whole of the recording area 100b and the recording area 100c in the CD-ROM 100. The main program and the code table are recorded in the program recording area 10c at the inner radius side of the CD-ROM 10. Further, the various kinds of data (that is the graphic data for the background image, the program code, the graphic code, and the likes) that are to be read in to the RAM 22 are recorded in the program recording area 10a at the outer radius side.

Moreover, in the program recording area 10a, one recording areas for certain graphic code and another recording area for a program code that utilizes that graphic code continues. In other words, the program code and the graphic code (hereinafter, these are referred to as a pair of codes) regarding the respective characters are recorded in the consecutive storage locations (sectors) within the recording area 10a.

Moreover, in the program recording area 10a, pairs of codes regarding the characters that may be displayed simultaneously are recorded in the proximity recording locations such that recording locations for program code and recording locations for graphic code are allocated alternately. For example, the above described player character 50 and the enemy characters 51 through 53 (the enemy characters #1 through #3) may be displayed simultaneously. Accordingly, in the program recording area 10*a*, as schematically shown in FIG. 23, the pairs of codes (each of which includes the program code and the graphic code) regarding these characters are stored in contiguous storage locations. Further, in the program recording area 10*a*, each pair of codes, each graphic data 65 and the likes are recorded such that as a use frequency thereof is higher, so are a recording locations thereof at much outer radius side of the CD-ROM 10. In other words, information with higher use frequency is recorded in a area composed of a recording locations which are closer to an outer edge of the CD-ROM 10.

Further, the CD-ROM 10 contains the above mentioned various kinds of information (the program, data, codes) as one file. Therefore, the code table read out from the CD-ROM 10 and written into RAM 22 is used for reading out the respective information in the CD-ROM 10.

Figure 24:
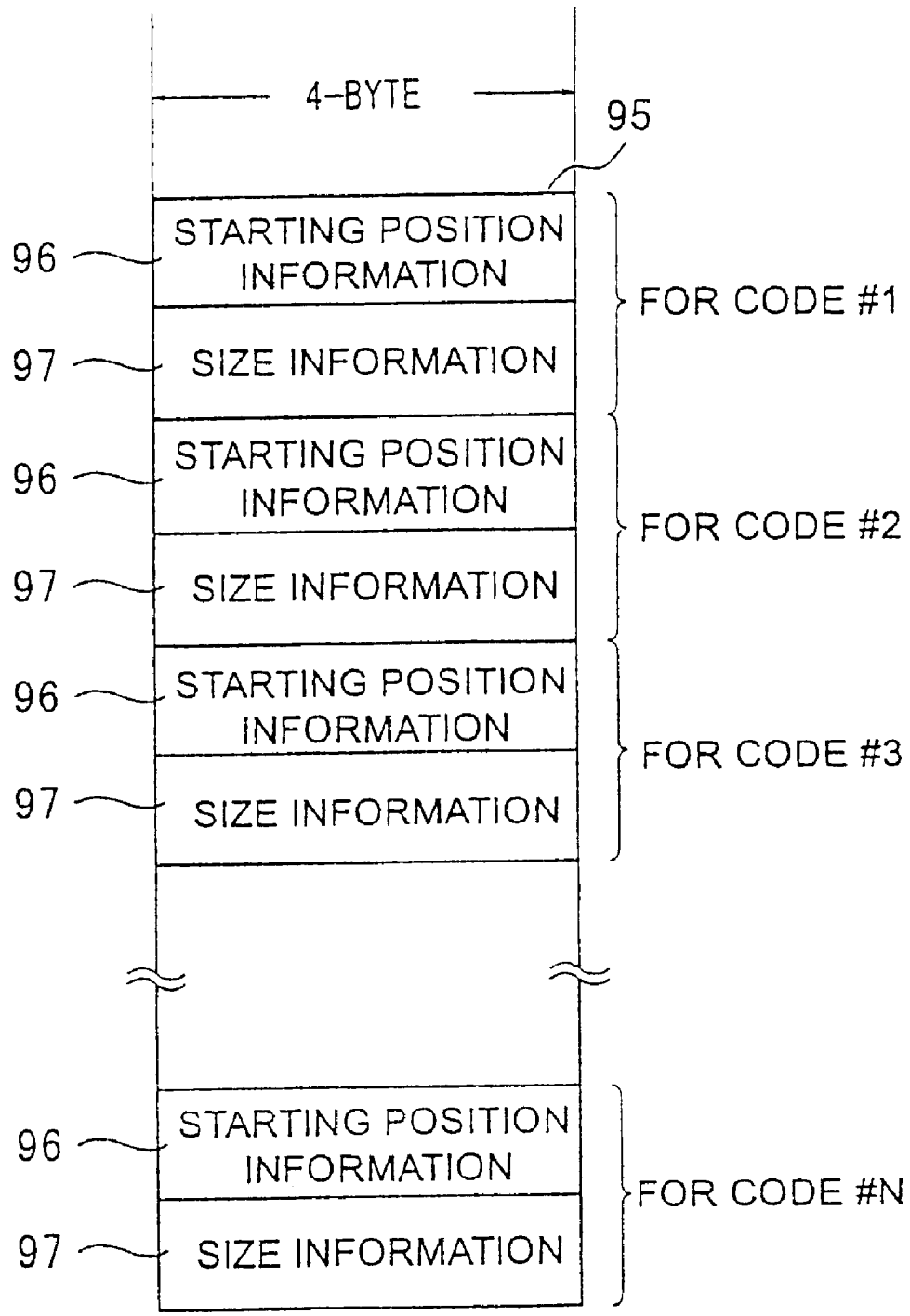
FIG. 24 is an illustrative diagram showing the code table that is referred to at a time when reading the data, the codes from the CD-ROM.

Concretely, as schematically shown in FIG. 24, the code table 90 holds starting position information 92 of 4 bytes and size information 94 of 4 bytes for each of codes #1 to #N. Here, N is a positive integer, and code #X (X is a integer, where $1 \leq X \leq N$) is a bulk of information, that is, the pair of codes, the graphic data and the likes, which may be read singly. The starting position information 92 for the code #X indicates a starting position of the recording area where the code #X is recorded, and the size information 94 of the code #X indicates the size of the code #X.

Furthermore, the main program contains instructions for reading out codes from the CD-ROM 10, each of which includes the code number X corresponding to the code #X. More specifically, the main program causes, at a time when a code of the code number X is to be read out from the CD-ROM 10 into RAM 22, the control unit 21 to obtain the starting position information 96 and the size information 97 corresponding to the code number X from the code table 95, and to read out the information which is recorded within an area from the position (sector) that is defined by the obtained starting position information 96, of which size is defined by the obtained size information 97, on the CD-ROM 10.

As described in detail above, the CD-ROM 10 stores units of information, which are required to be read out at one time, and which are read out frequently, in a recording area (that is, contiguous storage locations) at the outer radius side on the disk plane, where a relatively high speed reading is possible. The CD-ROM 10 stores the information that is not read out frequently (that is, the main program, the animation data) in the recording area at the inner radius side, where it will take a time for reading out, relatively. As a result, the information processing apparatus 20 set with this CD-ROM 10 will complete, a processing for updating the information to advance the game on the RAM 22 without making the CD-ROM drive 27 to perform a useless operation. Further, in the CD-ROM 10, the game software which is composed of the main program, the animation data, the program codes, the graphic codes and the likes is recorded as one file. As a result, storage capacity of the CD-ROM 10 is effectively utilized, since the storage capacity is not uselessly used for managing the file names, compared to the CD-ROM 100 shown in FIG. 1.

It should be noted that the above mentioned CD-ROM 10 is such that the program codes, the graphic codes and the likes are recorded in the storage areas at the outer radius side on the disk plane, but, for example, it may be arranged to record the movie data and the game program that controls the movie reproduction and the game operation based on the movie data into the recording areas at the inner radius side of the disk plane, and to record the data which is used with the game program into the recording area at the outer radius side. Namely, the information stored at the outer radius side may not be the information that is classified as the program as long as it is used frequently. On the contrary, a CD-ROM drive which accesses data recorded at the inner radius side at fast speed is used, it is desirable to produce the CD-ROM such that the program recording area exists at the inner radius side on the disk plane, while the animation data recording area exists at the outer radius side on the disk plane. Moreover, although a substantial amount of the data may be required for managing the file names, the program may be arranged such that the accesses to the program codes and to the graphic codes may be performed through the ISO9660.

It may be arranged such that the program codes and the graphic codes, which constitute the read-out pair of codes, are to be written into areas separated each other rather than into consecutive areas on the RAM 22. In other words, the storage area for use in the program codes and the storage area for use in the graphic codes may be prepared on the RAM 22, separately. Further, the above mentioned technology may be applied to a program other than the game program, and it may be also applied to a recording medium other than the CD-ROM (for example, a DVD or a hard disk).

The invention may be embodied in other specific forms without departing from the spirit or essential characteristics thereof. The present embodiments are therefore to be considered in all respects as illustrative and not restrictive, the scope of the invention being indicated by the appended claims rather than by foregoing description and all changes which come within the meaning and range of equivalency of the claims are therefore intended to be embraced therein.

What is claimed is:

1. A computer readable medium which is readable by a computer, comprising:

a plurality of program codes each of which is executed by the computer to perform specific processing, each program code being for a game character; and a plurality of pieces of data each of which is utilized by the computer executing related one of said plurality of program codes, each piece of data being for a game character, wherein each of said plurality of program codes is related to data among said plural pieces of data based upon the program code and the data both being associated with a common game character, the related code and data being recorded at contiguous storage locations on the medium.

2. An optical disk which is to be set to an optical disk reading device connected to a computer and be able to read information recorded in a storage location at an outer radius side faster than information recorded in a storage location at an inner radius side on a disk plane thereof, comprising:

a plurality of program codes each of which is executed by the computer to perform specific processing, each program code being related to a game character; and plural pieces of data each of which is utilized by the computer executing a related one of said plurality of program codes, each piece of data being related to a game character, wherein each of said plurality of program codes is related to data among said plural pieces of data based upon the program code and the data both being associated with a common game character, the related code and data being recorded at contiguous storage locations on the disk plane.

3. The optical disk according to claim 2, wherein said plurality of program codes and said plural pieces of data are recorded in a recording area at outer radius side of the disk plane.

4. The optical disk according to claim 3, wherein an animation data is recorded in a recording area at inner radius side of the disk plane.

5. The optical disk according to claim 3, wherein all information recorded therein is constituted in one file.

6. The optical disk according to claim 2, wherein each of said plural pieces of data is a graphic code that is required by the computer for displaying a game character.

7. An information processing apparatus comprising:

an optical disk, storing a plurality of program codes each of which is to be used for performing specific processing and plural pieces of data utilized by a related one of said plurality of program codes, each of said plurality of program codes and its related one of said plural pieces of data being recorded at contiguous storage locations, the related code and data being associated with a common game character;

a reading device to which said recording medium is set and which reads out the information from the recording medium;

a memory in which information read by said optical disk reading device is stored as a component of a program; and a control device performing a control in accordance with the program stored in said memory.

8. An information processing apparatus comprising:

an optical disk, storing a plurality of program codes each of which is to be used for performing specific processing and plural pieces of data each utilized by a related one of said plurality of program codes, each of said plurality of program codes and its related one of said plural pieces of data being recorded at contiguous storage locations on a disk plane thereof, the related code and data being associated with a common game character;

an optical disk reading device to which said optical disk is set and which reads out the information from the optical disk;

a memory in which information read by said optical disk reading device is stored as a component of a program; and a control device performing a control in accordance with the program stored in said memory.

9. The information processing apparatus according to claim 8, wherein said optical disk reading device reads information recorded in a storage location at an outer radius side on the disk plane faster than information recorded in a storage location at an inner radius side on the disk plane, and wherein said optical disk stores said plurality of program codes and said plural pieces of data in a recording area at an outer radius side of the disk platter.

10. The information processing apparatus according to claim 9, wherein said optical disk stores animation data at an inner radius side of the disk plane.

11. The information processing apparatus according to claim 10, wherein all information stored in said optical disk is constituted in one file.

12. The information processing apparatus according to claim 8, wherein each of said plural pieces of utilized data is a graphic code that is required for displaying a game character.

* * * * *